United States Patent

Tschaeschke

[11] Patent Number: 5,899,491
[45] Date of Patent: May 4, 1999

[54] VEHICLE WINDOW AIR BAG CURTAIN

[75] Inventor: Ulrich Tschaeschke, Ehningen, Germany

[73] Assignee: Daimler-Benz Aktiengesellschaft

[21] Appl. No.: 09/067,957

[22] Filed: Apr. 29, 1998

[30] Foreign Application Priority Data

Apr. 30, 1997 [DE] Germany ............ 197 18 203

[51] Int. Cl.$^6$ .................................. B60R 21/16
[52] U.S. Cl. ................. 280/730.2; 280/730.1; 280/749
[58] Field of Search .......... 280/730.2, 730.1, 280/743.1, 728.1, 749, 748, 743.2

[56] References Cited

U.S. PATENT DOCUMENTS

| 5,333,898 | 8/1994 | Stutz | 280/730.2 |
| 5,588,672 | 12/1996 | Karlow et al. | 280/730.2 |
| 5,599,042 | 2/1997 | Shyr et al. | 280/730.1 |
| 5,788,270 | 8/1998 | HAland et al. | 280/730.2 |

FOREIGN PATENT DOCUMENTS

| 2 222 621 | 11/1972 | Germany . |
| 92 11 423 | 12/1992 | Germany . |
| 41 37 749 A1 | 5/1993 | Germany . |
| 42 38 427 A1 | 5/1993 | Germany . |
| 43 07 175 A1 | 9/1993 | Germany . |
| 296 05 897 U1 | 9/1996 | Germany . |
| 196 43 322 A1 | 4/1997 | Germany . |

*Primary Examiner*—Robert J. Oberleitner
*Assistant Examiner*—Faye M. Fleming
*Attorney, Agent, or Firm*—Evenson, McKeown, Edwards & Lenahan, P.L.L.C.

[57] ABSTRACT

An air bag curtain, particularly for a vehicle window, comprises several tube-shaped chambers which are arranged side-by-side. The chambers are spaced from one another and can be filled with gas and have a largely circular cross-section after being filled with gas. In the effective gas-filled position, the air bag curtain extends between two lateral fastening points. The chambers, which are crossed by a tension line connecting the two fastening points with one another, are constructed with a bulge in the crossing area which results in the oval cross-section being oriented approximately in the direction of the tension line.

5 Claims, 1 Drawing Sheet

VEHICLE WINDOW AIR BAG CURTAIN

BACKGROUND AND SUMMARY OF THE INVENTION

This application claims the priority of German application 197 18 203.8, filed Apr. 30, 1997, the disclosure of which is expressly incorporated by reference herein.

The present invention relates to an air bag curtain for a vehicle window and the like, and more particularly, to an air bag curtain having several tube-shaped chambers which are arranged side-by-side, are spaced from one another and can be filled with gas and which have a largely circular cross-section after they are filled with gas.

DE 22 22 621 A1 describes an air bag curtain which can be filled with gas and in which, by way of a linear connection of the two curtain sections disposed on one another, gas-fillable tube shaped chambers are constructed. In the gas-filled effective position, the chambers have largely the same circular cross-section along its longitudinal course. As a result, a maximal energy absorption capacity exists when loaded by the occupants. A fixing of the air bag curtain in its effective position so that this curtain cannot be displaced from its protective covering position by the impacting occupant was not considered.

A general background of an air bag which is held in its effective position by additional holding devices is also found in DE 43 07 175 A1; DE 42 38 427 A1; DE 92 11 423 U1; and DE 41 37 749 A1.

An object of the present invention to hold an air bag curtain in a gas-filled manner in an effective securely protective position thereof.

This object has been achieved in accordance with the present invention by providing that in the effective position, in a gas-filled manner, the air bag curtain extends between two lateral fastening points, and in that the chambers, which are crossed by a tension line connecting the two fastening points with one another are each constructed with a bulging in the crossing area which results in an oval cross-section oriented approximately in the direction of the tension line.

An air bag curtain in accordance with the present invention is normally disposed in a gathered, stored manner along an edge of the vehicle window and is filled during the crash by the gas from an activated gas generator or gas accumulator. Thereby, the air bag is changed into its effective position in front of the vehicle window. The air bag can also be arranged, however, on the inside at the roof in the transverse direction of the vehicle and spread out in front of an occupant. That is, the air bag curtain, which in contrast to a single-chamber air bag, has individual, mutually gastightly separated chambers, has the advantage that the air bag curtain can be filled with a lower gas quantity which, in the event of a side impact, can be achieved particularly advantageously within a shorter time period and, because of the lower gas pressure, in a more protective manner for the occupant. Consequently, a circular gas-filled cross-section resulting from the boundary lines of a chamber leads to a maximal energy absorption capacity when the chambers are loaded by the occupants.

So that the air bag cannot be displaced from its effective position in the vehicle interior in front of the vehicle window by the impacting occupant, the curtain sides are fastened on the vehicle body and the interior panelling of the vehicle so that the gas filling of the chambers creates a tension line between the fastening points on both sides. The air bag curtain is thereby tensioned between the fastening points and is held close to the vehicle window.

On this tension line, the chambers are constructed with a larger width because of the course of the boundary lines bounding the chambers. Consequently, an oval cross-section of the chambers in the direction of the curtain surface is formed in this area by which a higher tension force can be generated between the fastening points without imparing the circular cross-sectional shape of the adjoining chamber areas.

This individual construction of the chambers results in an optimal energy consumption being maintained in the impact area of the occupant as the result of the circular cross-sectional shape of each chamber. A maximal tension can nevertheless be introduced into the air bag curtain along the tension line by way of which the air bag curtain is securely held in its effective position.

The effective position of the air bag curtain can be fixed in a particularly secure manner if the tension line is provided to extend below the point of gravity of the head of a sitting occupant. The shaping boundary lines of the chambers can easily be produced by a sewing or weaving together of the two opposite air bag walls.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
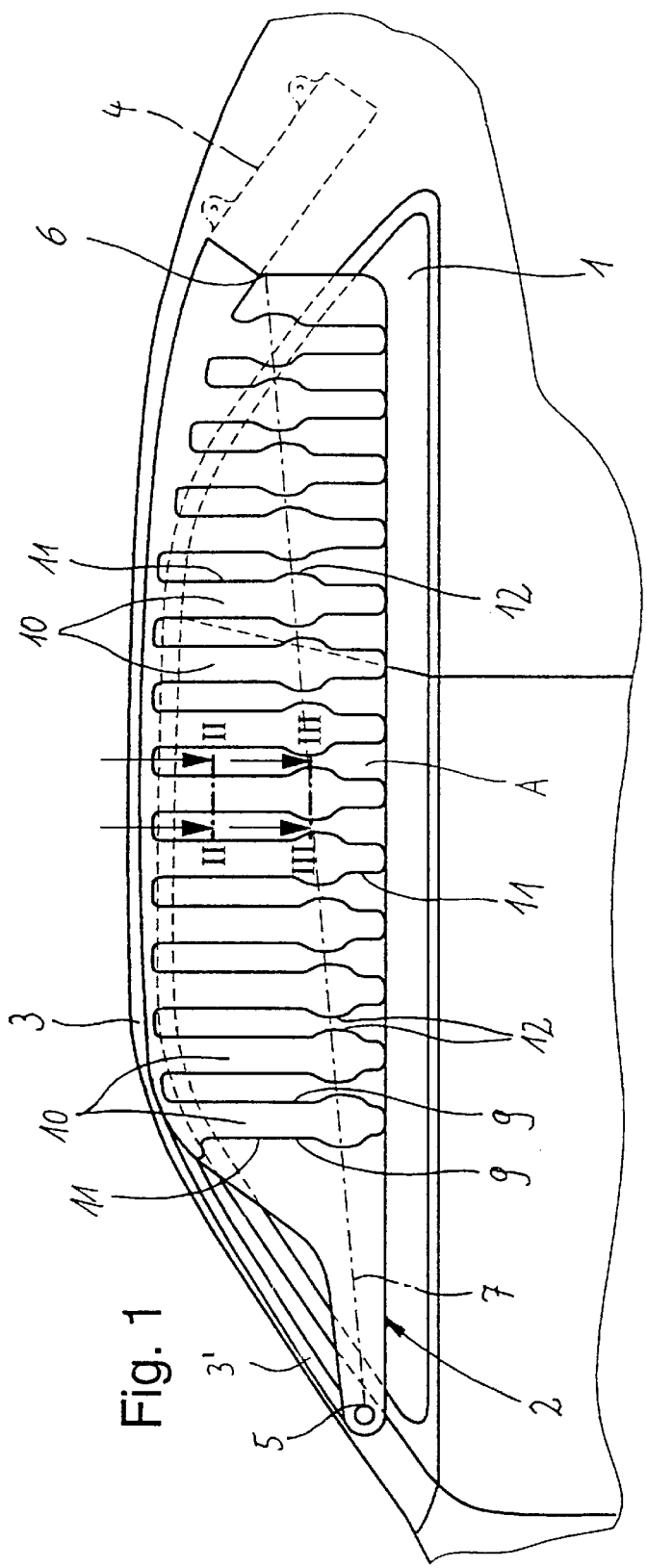
FIG. 1 is a side elevational view of an air bag curtain in the effective position in the vehicle interior in front of a vehicle side window.
Figure 2:
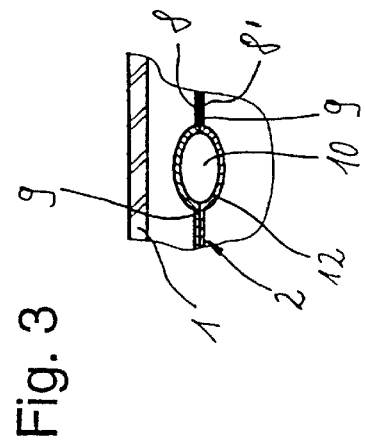
FIG. 2 is a cross-sectional view of a gas-filled chamber along line II—II of FIG. 1.
Figure 3:
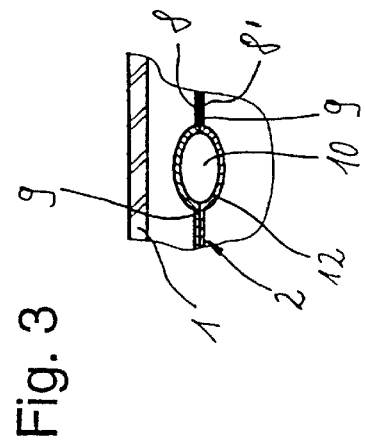
FIG. 3 is a cross-sectional view of the gas-filled chamber along line III—III of FIG. 1.

FIG. 1 illustrates an air bag curtain 2 in a vehicle interior in front of a vehicle side window 1, whereby the vehicle side window 1 is covered in the event of a crash in the impact area of a vehicle occupant who is protected thereby from a hard impact on the vehicle side window 1.

In a normal driving operation, the air bag curtain 2 takes up a gathered storage position along an upper boundary edge of the vehicle side window 1 in that it is folded in its full width into a receiving channel 3' extending along the roof frame 3. In the event of a crash, however, a gas generator 4 is activated which is arranged here behind the interior paneling of the vehicle in the C-column area and which fills the air bag curtain 2 with gas. Thereby, the curtain 2 emerges from its receiving channel 3' in the roof frame 3 and spreads out over the vehicle side window 1 downward into its effective position. The air bag curtain 2 remains fastened along its upper, transversely extending edge at the roof frame 3, this fastening also comprising two deeper-situated fastening points 5, 6 on the A-column and on the C-column.

By filling the air bag curtain 2 with gas, the air bag curtain 2 is tensioned along a tension line 7 illustrated by a dash-dotted line from the fastening point 5 on the A-column to the fastening point 6 on the C-column. As a result, the air bag curtain 2 is held in its effective position A in front of the vehicle side window 1 also in the event of the occupant's impact.

The air bag curtain is manufactured having two opposite air bag walls 8, 8', which are crossed by gastight boundary lines 9 which form tube-shaped chambers 10 which are arranged side-by-side over the width of the air bag curtain 2, are spaced from one another and can be filled with gas. These individual chambers 10 require a smaller amount of gas for the filling of the air bag curtain 2. This is particularly advantageous with respect to the side impact because the filling can be achieved in a shorter time span and in a more protective manner for the occupant with a lower gas pressure.

After the filling with gas in the event of a crash, the chambers 10 for the most part have a circular cross-section 11 and therefore a maximal energy absorption capacity when the chambers 10 are loaded by the occupant. The circular cross-section 11 is achieved of parallel-extending or mutually uniformly approaching or departing boundary lines 9.

So that the air bag curtain 2 in its effective condition A cannot be displaced by the impacting occupant from its position covering the vehicle side window 1, the air bag curtain 2 is fixed by one side respectively at the fastening point 5 on the A-column and at the fastening point 6 on the C-column. As a result of the gas filling, the air bag curtain 2 is also tensioned between these two fastening points 5, 6 along the tension line 7 and is held close to the vehicle side window 1.

Because of the direction or course of the boundary lines 9, the chambers 10 are constructed with a larger width than the adjoining areas on this tension line 7. This results in a bulging which forms an oval cross-section 12 in this area between the fastening points 5, 6 approximately in the direction of the tension line 7 in each chamber 10. Thereby, a larger tension force can be generated between the fastening points 5, 6 without impairing the circular cross-sectional shape 11 of the adjoining chamber areas.

An individual construction of the chambers 10 achieves an optimal energy absorption in the occupant's impact area as the result of the circular cross-sectional shape 11 of each chamber. Nevertheless, a maximal tension can be introduced into the air bag curtain 2 along the tension line 7 so that the air bag curtain 2 is held securely in its effective position A which can be fixed in a particularly secure manner if the tension line 7 is provided to extend below the gravity center of the head of a sitting occupant. The boundary lines 9 of the chambers 10 may be produced in a simple manner by sewing or weaving the two air bag walls 8 and 8' together.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Air bag curtain for a vehicle window, comprising a plurality of spaced tube-shaped chambers arranged side-by-side and arranged to be filled with gas so as to have a largely circular cross-section after being filled with the gas, wherein, in an effective position, in a gasfilled manner, the air bag curtain is configured to extend between two lateral fastening points, and the chambers, which are crossed by a tension line connecting the two fastening points are constructed with a bulge in a crossing area so as to result in an oval cross-section oriented approximately in the direction of the tension line.

2. The air bag curtain according to claim 1, wherein the tension line extends below a center of gravity of a sitting occupant's head.

3. The air bag curtain according to claim 1, wherein shaping boundary lines of the chambers are sewed or woven.

4. The air bag curtain according to claim 1, wherein the shaping boundary lines of the chambers are constructed to be substantially parallel.

5. The air bag curtain according to claim 1, wherein the air bag curtain is configured to take up a gathered storage position along a boundary edge of the vehicle window and is changed into the effective position upon gas filling, and is tensioned along the tension line between the fastening points.

* * * * *